United States Patent [19]
Frigo et al.

[11] Patent Number: 5,116,412
[45] Date of Patent: May 26, 1992

[54] INTERNAL MOULD RELEASE COMPOSITIONS

[75] Inventors: Roberto Frigo; Gian-Carlo Bagaglio, both of Varese, Italy

[73] Assignee: Imperial Chemical Industries PLC, London, United Kingdom

[21] Appl. No.: 723,658

[22] Filed: Jun. 26, 1991

Related U.S. Application Data

[63] Continuation of Ser. No. 551,799, Jul. 12, 1990, abandoned.

[30] Foreign Application Priority Data

Jul. 20, 1989 [GB] United Kingdom ................. 8916573

[51] Int. Cl.⁵ .............................................. B28B 7/38
[52] U.S. Cl. ............................. 106/38.24; 106/38.22
[58] Field of Search ................. 106/38.24; 524/701, 524/731, 711

[56] References Cited

U.S. PATENT DOCUMENTS 4,519,965  5/1985  Taylor et al. .......................... 264/51
4,585,803  4/1986  Nelson et al. ..................... 106/38.24

Primary Examiner—William R. Dixon, Jr.
Assistant Examiner—Margaret V. Einsmann
Attorney, Agent, or Firm—Cushman, Darby & Cushman

[57] ABSTRACT

An internal mould release composition comprising:
a) from 5% to 95% by weight of a metal salt of an organic acid, said metal salt having mould release properties and
b) from 5% to 95% by weight of a polyol and wherein the metal salt is in the form of homogenously dispersed solid particles having a diameter of up to 200μ.

7 Claims, No Drawings

INTERNAL MOULD RELEASE COMPOSITIONS

This is a continuation of application Ser. No. 07/551,799 abandon, filed on Jul. 12, 1990, which was abandoned upon the filing hereof.

This invention relates to internal mould release compositions and to their use in the production of moulded articles by the reaction injection moulding process from reaction mixtures containing organic polyisocyanates and isocyanate-reactive components.

The production of moulded articles, for example automotive body parts, from organic polyisocyanates and isocyanate-reactive components by moulding processes, such as for example the reaction injection moulding (RIM) process is well established. In RIM process, two highly reactive liquid streams, one containing a polyisocyanate and the other containing isocyanate-reactive components, for example polyol and/or polyamine reactants, are impingement mixed and rapidly injected into a mould cavity. By this method, high production rates of moulded polyurethane, polyurea and related polymeric articles having excellent physical properties can be achieved.

Whilst the RIM process is eminently suited to the mass production of isocyanate-based moulded articles, it is essential to its successful and economic operation that the moulded product can be easily removed from the mould without being damaged. One method of facilitating demoulding is to coat the internal surfaces of the mould with a mould release agent, for example a wax or soap. This procedure has the disadvantage that application of the release agent has to be repeated almost every time the mould is used, adding substantially to the time and cost of the process. In order to overcome the problems associated with external mould release agent, it has been proposed to use release agents of the internal type pre-blended with the isocyanate-reactive component. One type of internal release agent which has been successfully used in the production of moulded plastics articles comprises metal carboxylates such as zinc stearate. Unfortunately, such salts are not or badly soluble in most of the usual isocyanate-reactive components. It has been proposed, therefore, to use the metal salts in conjunction with certain materials which have the effect of compatibilising the salts with the isocyanate-reactive compounds. Thus, for example, it has been proposed in European Patent Publications 119471, 173888 and 190317 to employ various amino compounds as compatibilisers.

It has now been found that a composition which contains solid particles of a metal salt of an organic acid, such as zinc stearate, homogeneously dispersed in a polyol or in a mixture of polyols, provides internal mould release properties in the manufacture of moulded polyurethane, polyurea and like polymers, from isocyanate and isocyanate reactive compounds.

Accordingly, the invention provides an internal mould release composition comprising:

a) from 5% to 95% by weight of a metal salt of an organic acid, said metal salt having mould release properties and b) from 5% to 95% by weight of a polyol and wherein the metal salt is in the form of homogenously dispersed solid particles having a diameter of up to 200μ.

Preferably, the amount of metal salt present in the compostion should range from 10% to 50% by weight, more preferably from 10% to 30% by weight.

The metal salts present in the compositions of the invention may be any salt which are derived from organic acids and which have mould release properties. Such salts have been fully described in the prior art relating to the moulding of polyurethanes, polyureas and other resins.

The organic acids from which the salts may be derived particularly include carboxylic acids containing from 8 to 24 carbon atoms. Such acids may be aromatic or cycloaliphatic but are preferably aliphatic monocarboxylic acids which may be straight-chain or branched, saturated or unsaturated and may carry substituents such as hydroxy, amino or amido groups. The most preferred aliphatic monocarboxylic acids are the so-called "fatty acids" having from 10 to 18 carbon atoms, for example lauric, palmitic, stearic, isostearic, oleic, linoleic and ricinoleic acids and mixtures of any of these. The metal salts may be salts of any metal of Groups I and II of the Periodic Table or of other metals such as chromium, molybdenium, iron, cobalt, nickel, aluminium, tin, lead, antimony or bismuth. The preferred metals are lithium, magnesium, calcium, barium, iron, cobalt, nickel, copper, zinc, cadmium and aluminum and mixtures thereof.

As examples of particularly suitable salts there may be mentioned zinc stearate, zinc oleate, zinc palmitate, zinc laurate, zinc octoate, zinc ricinoleate and the calcium, magnesium, nickel and copper salts of lauric, palmitic, stearic and oleic acids. The most preferred salt is zinc stearate.

The polyol(s) of the internal mould release (IMR) composition should have an average functionality of 2 to 4, preferable of 2 to 3 and an average equivalent weight of 500 to 5000. Preferred average equivalent weights range from 750 to 4000, for example, from 1000 to 3000.

Mixtures of two or more polyols varying in functionality, equivalent weight and/or polymer backbone may be used provided such mixtures conform to the average functionality and average equivalent weight criteria specified herein. Suitable polyols and methods for their preparation have been fully described in the prior art and, as examples of such polyols, there may be mentioned polyesters, polythioethers, polycarbonates, polyacetals, polyolefins, polysiloxanes and, especially, polyethers.

Polyether polyols which may be used include products obtained by the polymerisation of a cyclic oxide, for example ethylene oxide, propylene oxide, butylene oxide or tetrahydrofuran in the presence, where necessary, of polyfunctional initiators. Suitable initiator compounds contain a plurality of active hydrogen atoms and include water and polyols, for example ethylene glycol, propylene glycol, diethylene glycol, cyclohexane dimethanol, resorcinol, bisphenol A, glycerol, trimethylolpropane, 1,2,6-hexanetriol or pentaerythritol. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Random copolymers having oxyethylene contents of 10–80%, block copolymers having oxyethylene contents of up to 25% and random/block copolymers having oxyethylene contents of up to 50%, based on the total weight of oxyalkylene units may be mentioned. Mixtures of the said diols and triols can be particularly useful. Other particularly useful polyether polyols include polytetramethylene glycols obtained by the polymerisation of tetrahydrofuran.

Polyester polyols which may be used include hydroxyl-terminated reaction products of polyhydric alcohols such as ethylene glycol, propylene glycol, diethylene glycol, 1,4-butanediol, neopentyl glycol, 1,6-hexanediol, cyclohexane dimethanol, bis(hydroxyethyl) terephthalate, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof.

Polythioether polyols which may be used include products obtained by condensing thiodiglycol either alone or with other glycols, alkylene oxides, dicarboxylic acids, formaldehyde, amino-alcohols or aminocarboxylic acids. Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo- and copolymers and suitable polysiloxane polyols include polydimethylsiloxane diols and triols.

Other polyols which may be used comprise dispersions or solutions of addition or condensation polymers in polyols of the types described above. Such modified polyols have been fully described in the prior ar and include products obtained by the in situ polymerisation of one or more vinyl monomers, for example styrene and acrylonitrile, in polymeric polyols, for example polyether polyols. The internal mould release (IMR) composition of the present invention may be conveniently prepared by grinding or milling the solid particles of metal salt with the polyol(s) of the present composition. The particle size of the metal salt in the IMR composition should not exceed 200µ and preferably not 50µ.

The present IMR composition is generally in the form of a paste.

As indicated above, the internal mould release compositions of the invention are useful in the production of moulded articles by a process comprising reacting in a suitable mould a polyisocyanate composition with a isocyanate-reactive composition comprising one or more compounds containing a plurality of isocyanate-reactive groups in the presence of said mould release composition.

It is thus another aspect of the invention to provide a reaction system for use in the manufacture of moulded articles, which comprises:
1) a polyisocyanate composition
2) an isocyanate-reactive composition which contains
(i) at least one isocyanate-reactive compound having an average molecular weight of from 1500 to 12000 and, optionally
(ii) at least one chain extender having a molecular weight of less than 1500 and which further contains an effective amount of an internal mould release composition as hereinbefore described.

It is further aspect of the invention to provide a reaction system for use in the manufacture of moulded articles by the RIM process, which comprises:
1) a polyisocyanate composition
2) an isocyanate-reactive composition which contains
(i) at least one isocyanate-reactive compound having an average molecular weight of from 1500 to 12000,
(ii) at least one chain extender having a molecular weight of less than 1500 and which further contains an effective amount of an internal mould release composition as hereinbefore described.

The expression "an effective amount" used herein means an amount of the mould release composition of the invention sufficient to provide acceptable mould release when incorporated into the isocyanate reactive composition used in a moulding process.

Suitably, the present IMR composition may be incorporated in the isocyanate-reactive composition by mixing or stirring, in order to provide for substantial dispersion of the IMR composition into said isocyanate-reactive composition.

Isocyanate-reactive compounds which may be present in the isocyanate-reactive composition includes polyols, polyamines, imino-functional polymers, enamine containing polymers and mixtures thereof.

Polymeric polyols having molecular weights in the range from 1500 to 12000 are well known as polyurethane components and may be prepared by methods fully described in the prior art. As examples of suitable polyols there may be mentioned polythioethers, polyesters, polyesteramides, polycarbonates, polyacetals, polyolefins, polysiloxanes and, especially, polyethers.

Polyether polyols which ma be used include products obtained by the polymerisation of a cyclic oxide, for example ethylene oxide, propylene oxide or tetrahydrofuran in the presence, where necessary, of polyfunctional initiators. Suitable initiator compounds contain a plurality of active hydrogen atoms and include water, polyols, for example ethylene glycol, propylene glycol, diethylene glycol, resorcinol, bisphenol A, glycerol, trimethylolpropane, 1,2,6-hexanetriol, triethanolamine, pentaerythritol, sorbitol or sucrose, ammonia, primary monoamines, for example aniline or benzylamine, polyamines, for example ethylene diamine, hexamethylene diamine, toluene diamines, diaminodiphenylmethanes and polymethylene polyphenylene polyamines obtained by the condensation of aniline and formaldehyde, and aminoalcohols, for example ethanolamine and diethanolamine. Mixtures of initiators and/or cyclic oxides may be used.

Especially useful polyether polyols include polyoxypropylene and poly(oxyethylene-oxypropylene) diols and triols obtained by the simultaneous or sequential addition of ethylene and propylene oxides to appropriate di- or trifunctional initiators as fully described in the prior art. Mixtures of the said diols and triols are often particularly useful.

Because of their enhanced reactivity, ethylene oxide tipped polyols are often preferred.

Polyester polyols which may be used include hydroxyl terminated reaction products of polyhydric alcohols such as ethylene glycol, propylene glycol, diethylene glycol, 1,4-butanediol, polyether polyols, bis(hydroxyethyl) terephthalate, glycerol, trimethylolpropane or penaerythritol or mixtures thereof with polycarboxylic acids, especially dicarboxylic acids or their ester-forming derivatives, for example succinic, glutaric and adipic acids or their dimethyl esters, sebacic acid phthalic anhydride, tetrachlorophthalic anhydride or dimethyl terephthalate. Polyesters obtained by the polymerisation of lactones, for example caprolactone, in conjunction with a polyol, may also be used. Polyester-amides may be obtained by the inclusion of aminoalcohols such as ethanolamine in polyesterification mixtures.

Polythioether polyols which may be used include products obtained by condensing thiodiglycol (either alone or with other glycols), with dicarboxylic acids, formaldehyde, alkylene oxides, aminocarboxylic acids, or combinations thereof.

Polycarbonate polyols which may be used include products obtained by reacting diols such as 1,3-propanediol, 1,4-butanediol, 1,6-hexanediol, diethylene glycol or tetraethylene glycol with diaryl carbonates, (for example diphenyl carbonate), with cyclic carbonates (i.e ethylene carbonate), or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated homo- and copolymers and suitable polysiloxane polyols include polydimethylsiloxane diols and triols, wherein the hydroxyl groups are organically bound.

Polymeric polyamines having molecular weights in the range from 1500 to 2000 are well known as components of polyurea forming reaction mixtures and may be prepared by methods fully described in the prior art. As examples of suitable polyamines, there may be mentioned amino-terminated polythioethers, polyesters, polyesteramides, polycarbonates, polyacetals, polyolefins, polysiloxane and, especially, polyethers obtained by replacing the hydroxy groups of the corresponding polyols partially or completely by secondary or preferably primary amino groups. The preferred polymeric polyamines are polyether diamines and triamines, especially polyoxypropylene diamines and triamines.

Imino-functional polymers having molecular weights in the range from 1500 to 12000 have been fully described in EP 284253 which is enclosed herein by reference. The preferred imino-functional polymers are imine-terminated polyethers such as may be obtained for example by reacting an aldehyde or ketone with a polyether polyamine, especially a polyoxypropylene diamine or triamine.

Enamine functional polymers may be prepared either from secondary amine terminated resins (i.e. polyethers) by reaction with ketones/aldehydes having one or more alpha hydrogens, or by reacting ketone/aldehyde terminated resins (bearing alpha hydrogens) with secondary amines, providing for removal of the $H_2O$ formed in the reactions. Secondary amine terminated resins can be obtained, for example by catalytic hydrogenation of the imino-functional polymers described hereinabove. Ketone/aldehyde terminated resins may be obtained, in general, by oxidation of the corresponding secondary or primary hydroxyl terminated resin. More highly reactive enamine functional polymers can be prepared by oxidizing a primary hydroxy functional resin to the corresponding polycarboxylic acid, conversion of the said groups to orthoesters and treatment of the latter, with an excess of a secondary amine. Each orthoester must contain at least one alpha hydrogen atom. Isocyanate-reactive polymers for inclusion in the isocyanate-reactive compositions of the invention preferably have molecular weights in the rang from 2000 to 8000 and have isocyanate-reactive functionalities of from 2 to 4, especially 2 or 3.

Chain extenders having molecular weights below 1500 which may be present in the isocyanate-reactive compositions of the invention have been fully described in the prior art and include polyols, polyamines, hydroxy-amines and imino-compounds.

Mixtures of different chain extenders may be used if desired. Preferred chain extenders have molecular weights below 800 and often below 500.

Polyols which may be used as chain extenders include ethylene glycol and 1,4-butanediol.

Polyamines which may be used as chain extenders include aliphatic polyamines, especially diamines, and aromatic polyamines, especially sterically hindered diamines. Ethylene diamine and low molecular weight polyether diamines are examples of suitable aliphatic polyamines whilst suitable aromatic diamines include 3,5-diethyl-2,4-toluene diamine, 3,5-diethyl-2,6-toluene diamine and mixtures thereof (referred to as DETDA), 4,4'- and 2,4'-diaminodiphenylmethanes and mixtures thereof, 2,4- and 2,6-diaminotoluenes and mixtures thereof, 1,3,5-triisopropyl-2,4-diaminobenzene, 3,3', 5,5'-tetraisopropyl-4,4'-diaminodiphenylmethane and the like.

The relative proportions of isocyanate-reactive polymer and chain extender present in the isocyanate-reactive compositions of the invention generally conform to the teachings of the prior art. The concentration of internal mould release composition in the isocyanate-reactive composition is typically such that the latter contains from about 0.1 to about 10% by weight of metal salt, preferably from about 0.5% to about 5%.

Polyisocyanate compositions which may be reacted with the above described isocyanate-reactive compositions in the moulding process may include any of the aliphatic, cyclo-aliphatic, araliphatic or aromatic polyisocyanates known in polyurethane or polurea chemistry, especially those that are liquid at room temperature.

Examples of suitable polyisocyanates include 1,6-hexamethylene diisocyanate, isophorone diisocyanate, cyclohexane-1,4-diisocyanate, 4,4'-dicyclo-hexylmethane diisocyanate, 1,4-xylylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenylene polyisocyanates (crude MDI) and 1,5-naphthylene diisocyanate. Mixtures of polyisocyanates can be used and also polyisocyanates which have been modified by the introduction of urethane, allophanate, urea, biuret, carbodiimide, uretonimine or isocyanurate residues.

In general, the aromatic polyisocyanates are preferred, especially the available MDI isomers, that is to say 4,4'-diphenylmethane diisocyanate, 2,4'- diphenylmethane diisocyanate and mixtures thereof. MDI variants such as uretoniminemodified MDI and MDI prepolymers are also of great value in the moulding process.

The reaction systems of the invention may also contain other conventional ingredients of such systems, said ingredients usually being present in the isocyanate-reactive compositions of the invention. Such ingredients include catalysts, for example tin compounds and tertiary amines, surface-active agents and foam stabilisers, for example siloxane-oxyalkylene copolymers, blowing agents, for example water and low boiling halogenated hydrocarbons, flame retardants, plasticisers, dyes, fillers and reinforcing agents.

In the moulding process, the techniques and equipment used may be those that have been fully described in the prior art. RIM processes which may be used include structural (including mat-reinforced) RIM and amine extended RIM processes.

The invention is illustrated but not limited by the following Example:

An internal mould release composition according to the present invention was prepared by mixing, at room temperature:
- 80 parts by weight of an ethylene oxide tipped oxypropylated glycerol of molecular weight 6000 (marketed by ICI under the trade name Daltocel F 2805)
- 20 parts by weight of zinc stearate purchased from Industrie Chimiche FAVARELLI, under the name "Stearato di Zinco 5"

The composition was prepared on a three cylinders mixer from the firm Officine Meccaniche Molteni SPL.

The viscosity of the obtained composition was of 7500 cPs. Its density was of 1.06.

The particles of Zn Stearate dispersed in the composition had a diameter of 3 microns.

We claim:

1. An internal mold release composition comprising:
   a) from 5% to 95% by weight of a metal salt of an organic acid, said metal salt having mold release properties and
   b) from 5% to 95% by weight of a polyol and wherein the metal salt is in the form of homogeneously dispersed solid particles having a diameter of up to 200μ with the proviso that a compatibilizer comprising a member selected from the group consisting of nitrogen-containing, isocyanate-reactive, acyclic compounds and nitrogen containing, isocyanate-reactive polymers and tertiary amines is not present in a compatibilizing amount.

2. A reaction system for use in the manufacture of moulded articles which comprises:
   1) a polyisocyanate composition
   2) an insocyanate-reactive composition which contains
      (i) at least one isocyanate-reactive compound having an average molecular weight of from 1500 to 12000 and, optionally
      (ii) at least one chain extender having a molecular weight of less than 1500
   and which further contains an effective amount of an internal mould release composition according to claim 1.

3. A reaction system for use in the manufacture of moulded articles by the RIM process which comprises:
   1) a polyisocyanate composition
   2) an isocyanate-reactive composition which contains
      (i) at least one isocyanate-reactive compound having an average molecular weight of from 1500 to 12000
      (ii) at least one chain extender having a molecular weight of less than 1500
   and which further contains an effective amount of an internal mould release composition according to claim 1.

4. A moulded article obtained by using a reaction system according to claim 2 or claim 3.

5. An internal mold release composition consisting essentially of
   a) from 5% to 95% by weight of metal salt of an organic acid, said metal salt having mold release properties and
   b) from 5% to 95% by weight of a polyol and wherein the metal salt is in the form of homogeneously dispersed solid particles having a diameter of up to 200μ.

6. The reaction system according to claim 2 wherein said mold release composition consists essentially of
   a) from 5% to 95% by weight of a metal salt of an organic acid, said metal salt having mold release properties and
   b) from 5% to 95% by weight of a polyol and wherein the metal salt is in the form of homogeneously dispersed solid particles having a diameter of up to 200μ.

7. The reactions system according to claim 3 wherein said mold release composition consisting essentially of
   a) from 5% to 95% by weight of a metal salt of an organic acid, said metal salt having mold release properties and
   b) from 5% to 95% by weight of a polyol and wherein the metal salt is in the form of homogeneously dispersed solid particles having a diameter of up to 200μ.

* * * * *